Dec. 2, 1924.

R. H. WILSON

COASTER CAR

Filed Dec. 8, 1921

1,518,037

Inventor
Robert H. Wilson,

By
Attorney

Patented Dec. 2, 1924.

1,518,037

UNITED STATES PATENT OFFICE.

ROBERT H. WILSON, OF BALTIMORE, MARYLAND.

COASTER CAR.

Application filed December 8, 1921. Serial No. 520,865.

*To all whom it may concern:*

Be it known that ROBERT H. WILSON, a citizen of the United States of America, residing at Baltimore, in the State of Maryland, has invented new and useful Improvements in Coaster Cars, of which the following is a specification.

The object of the invention is to provide an improved toy in the form of a coaster car or vehicle wherein the occupant is adapted to be conveniently and comfortably supported in a reclining position under conditions affording complete control of the vehicle; and with these objects in view the invention consists in a construction and combination of parts of which a preferred embodiment is shown in the accompanying drawings, wherein—

Figure 1:
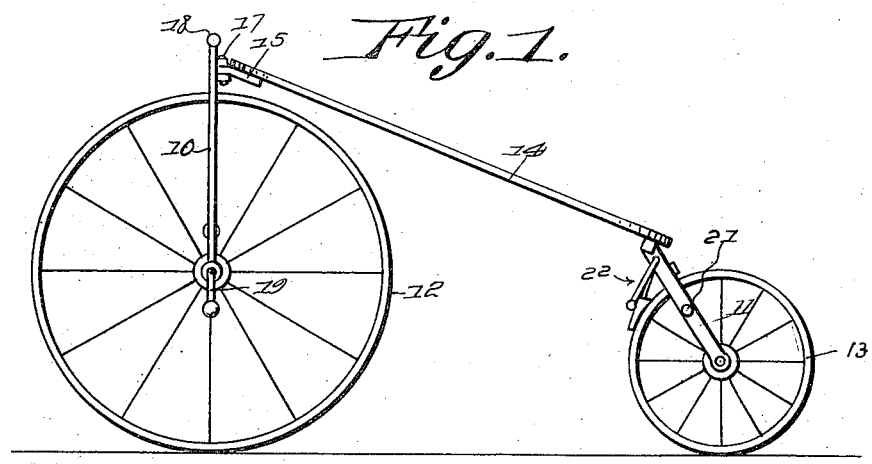
Figure 1 is a side view of a car embodying the invention.
Figure 2:
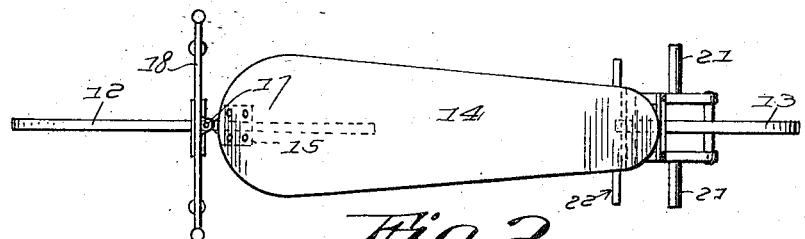
Figure 2 is a plan view thereof.
Figure 3:
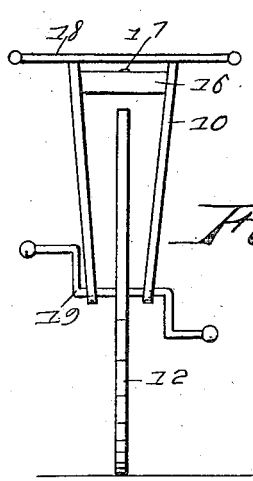
Figures 3 and 4 are respectively front and rear views of the same.
Figure 4:
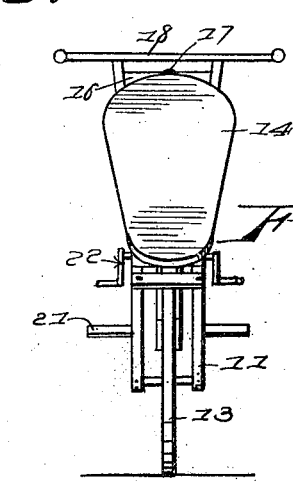

The vehicle consists essentially of front and rear forks 10 and 11 in which are mounted front and rear wheels 12 and 13, and a body consisting of a board or platform 14 connecting said forks and arranged in an upwardly and forwardly inclined position so as to support the occupant of the car in a reclining face downward position as in coasting but with the head raised sufficiently by reason of the inclination of the platform and the preferably greater diameter of the front wheel, to afford him a clear view ahead as a means of safely guiding the vehicle through the agency of the front fork which is pivotally connected with the front end of the platform.

In the construction illustrated a bracket 15 is secured to the front end of the platform and a cross bar 16 of the front fork is jointed as at 17 to the bracket to afford a lateral turning movement to the front fork which carries a handle bar 18.

The front or steering wheel may also, if desired, be provided with cranks 19 by which the vehicle may be propelled by hand while the occupant is occupying the above indicated reclining position on the platform.

In the construction illustrated a single rear wheel is shown mounted in the rear fork but it should be understood that the number is not necessarily so limited but may be varied to suit the preference of the tread, and preferably the rear fork is provided with laterally projecting pegs or studs 21 forming foot rests for comfortably supporting the feet of the occupant while coasting and to facilitate in maintaining a proper balance in the operation of the device.

Also as indicated in a general way at 22 a brake may be mounted upon the rear fork within convenient reach of the foot of the occupant of the car for contact with the periphery of the rear wheel to check or limit the speed of movement of the vehicle.

Having described the invention, what is claimed as new and useful is:—

1. A coaster car or vehicle having an elongated upwardly and forwardly inclined platform for supporting an occupant in a reclining face downward position, and front and rear forks connected with the corresponding extremities of said platform and provided with ground traversing elements consisting of wheels of which the front one has its axle extended laterally beyond the forks and provided with cranks for manual operation.

2. A coaster car or vehicle having an elongated upwardly and forwardly inclined platform for supporting an occupant in a reclining face downward position, and front and rear forks connected with the corresponding extremities of said platform and provided with ground traversing elements, the forward fork being pivotally mounted and having a steering bar and the rear fork being provided with laterally projecting foot rests.

In testimony whereof he affixes his signature.

ROBERT H. WILSON.